| United States Patent [19] | [11] | 4,361,985 |
|---|---|---|
| DeMarco | [45] | Dec. 7, 1982 |

[54] HYDRAULIC DOOR OPENING/CLOSING AND LOCKING/UNLOCKING APPARATUS

[75] Inventor: Thomas M. DeMarco, Chicago, Ill.

[73] Assignee: NFE International Ltd., Chicago, Ill.

[21] Appl. No.: 213,928

[22] Filed: Dec. 8, 1980

[51] Int. Cl.³ ............................................. E05F 15/00
[52] U.S. Cl. .......................................... 49/280; 49/281
[58] Field of Search .................. 49/280, 281; 298/235; 296/56

[56] References Cited

U.S. PATENT DOCUMENTS

| 3,440,763 | 4/1969 | O'Brien | 49/280 |
| 3,440,764 | 4/1969 | Cover | 49/280 |
| 3,757,969 | 9/1973 | Smith | 49/280 X |
| 3,860,288 | 1/1975 | Martin et al. | 49/280 X |
| 3,873,149 | 3/1975 | Churchman | 49/281 X |

*Primary Examiner*—Philip C. Kannan
*Attorney, Agent, or Firm*—Merriam, Marshall & Bicknell

[57] ABSTRACT

A hydraulically operated tailgate door which is pivotally hinged to move in an arc about the door hinge until the door is substantially vertical in position adjacent the door frame. Means are provided to enable the door to be moved substantially parallel to the door frame during movement from the closed position to a locked position. The same hydraulic cylinders provided for raising and lowering the door are also utilized for locking and unlocking the door.

10 Claims, 3 Drawing Figures

HYDRAULIC DOOR OPENING/CLOSING AND LOCKING/UNLOCKING APPARATUS

This invention relates to hydraulically operated doors, and in particular to hydraulically operated tailgate doors for vehicles, such as trucks having a bed which can be raised for dumping material after the tailgate door is opened.

BACKGROUND OF THE INVENTION

Many trucks having raised beds include a manually releasable or powered latch for the tailgate door and hydraulic cylinders for pivotally raising the door to an open position. After dumping, the door is then pivotally lowered to a closed position and manually locked. In such pivoting tailgate doors, since the doors are hinged at the top, generally the door seal is much better at the top of the door then at the bottom where it is latched. Often, shims are used at the door hinge mounting positions to move the top of the door away from the frame in an attempt to equalize the seal around the door perimeter. Shim adjustment, however, is very time consuming, and at best, results in a degradation of the tight seal at the top of the door while providing a moderate seal around the entire door perimeter.

Therefore, it is desired to provide a hydraulically operated tailgate door which is pivotally hinged and yet can provide a tight seal around the entire door perimeter. Also, it is desired to provide a hydraulically operated tailgate door without requiring manual locking and unlocking of the door.

SUMMARY OF THE INVENTION

In accordance with the principles of the present invention, there is provided a hydraulically operated tailgate door which is pivotally hinged to move in an arc about the door hinge until the door is substantially vertical in position adjacent the door frame. Means are provided to enable the door to be moved in a restricted horizontal manner, substantially parallel to the door frame during movement from the closed position to a locked position. The same hydraulic cylinders provided for raising and lowering the door are also utilized for locking and unlocking the door.

In particular, there is provided a tailgate door hinged at the top of the door frame with a pair of hydraulic cylinders mounted to the door frame and attached at each end of the door for raising and lowering the door. An angled bracket for each hydraulic cylinder has one end pivotally mounted to the door frame, a middle portion connected to one end of one of the hydraulic cylinders, and another end pivotally connected through one end of a pivoting door lift bar to the door. The other end of the pivoting bar is connected to a slide rod assembly mounted for slidable movement vertically along the door. The slide rod assembly at each end of the door includes a pair of locking pins for engaging respective slotted door latches rigidly mounted to the door frame.

The door is in the locked position when the locking pins are at the bottom of the slot in each respective door latch. Operating the hydraulic cylinder pivots the angled bracket and the attached pivoting door lift bar to slidably move the slide rod vertically along the door frame thereby moving the locking pins upwardly out of the latching slot. The locking pin continues to move vertically within a channel slot provided in the door until reaching the top of the channel slot at which time the door is pivotally raised about the door hinge to the open position through continued operation of the hydraulic cylinder. The door hinge clevis includes a horizontal slot slightly larger than the hinge pin to enable the door to move slightly outwardly in a restricted horizontal manner substantially parallel to the door frame during unlocking and before raising, and to move slightly inwardly during locking, while preventing vertical movement of the door.

During closing, the hydraulic cylinder is operated to pivotally lower the door about the door hinge until the locking pins engage an angled portion leading to the latching slot of the respective door latches. In this position, the door is substantially vertical and substantially parallel to the door frame. Continued operation of the hydraulic cylinder pivots the angled bracket and the pivoting bar to move the slide rod vertically downward in the door channel slot. This forces the locking pins along the angled latch portion and moves the door in a restricted horizontal, parallel movement into the door frame until the locking pins engage the bottom of the latch slot thereby locking the door in position. Thus, the door is moved substantially parallel to and only horizontally into the door frame for equalized sealing around the door perimeter and latched to the vehicle door frame opening at the four corners thereof.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the several figures and in which:

DETAILED DESCRIPTION

Figure 1:
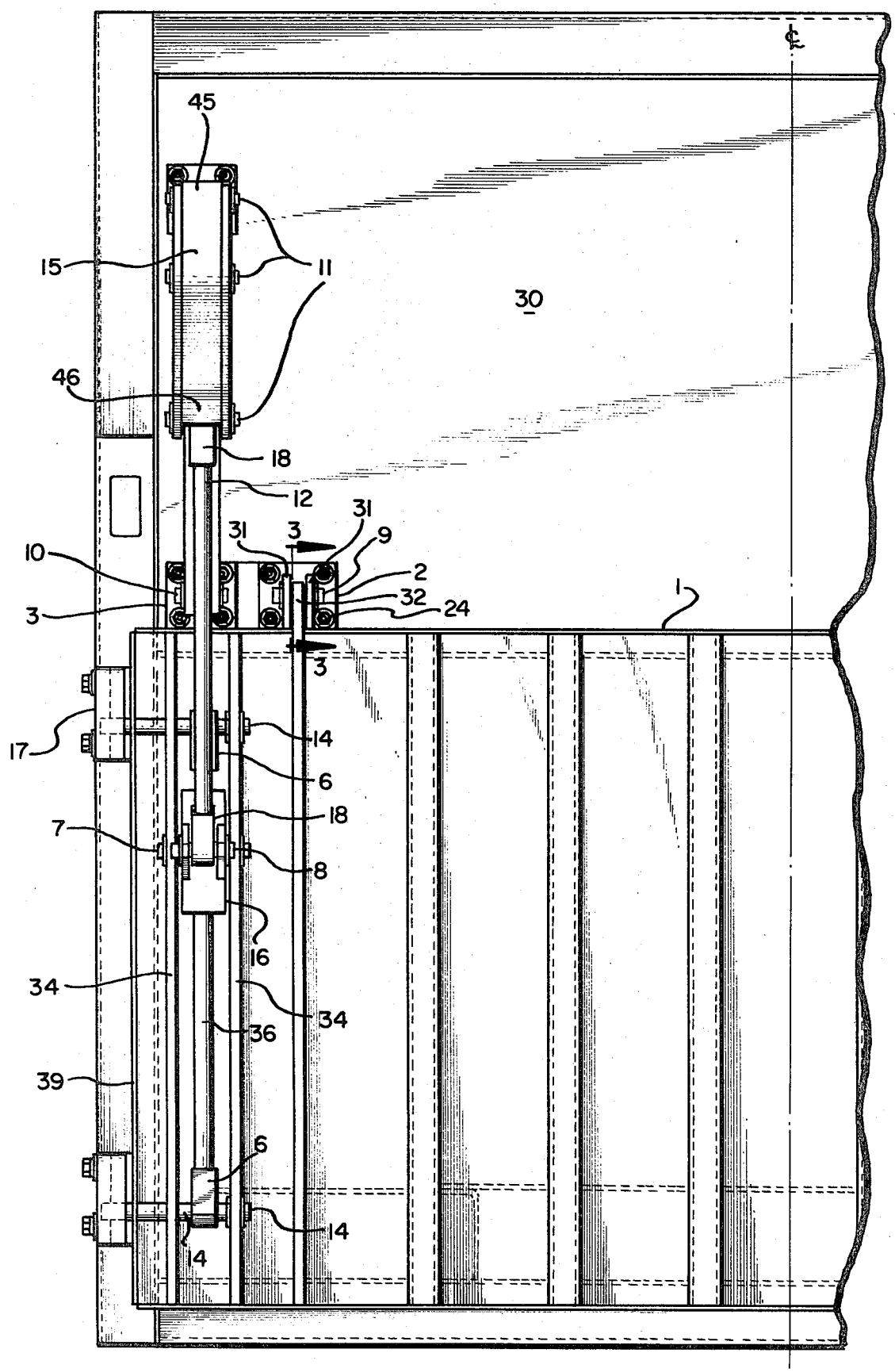
FIG. 1 is a front elevational view, symmetrical about the center line, illustrating a vehicle door frame and a hydraulically operated door which can be unlocked, raised, lowered, and locked with the same hydraulic means.

Referrig now to the drawings, there is illustrated a preferred embodiment of the present invention in which a tailgate door 1 is mounted by means of a hinge bracket 2 to a door frame opening at the rear of a vehicle such as a truck 30. It is understood that in connection with FIG. 1, only one half of the vehicle and the tailgate door is illustrated, the right hand portion being symmetrical about the indicated center line. A pair of apertured flanges 31 extend from hinge bracket 2 for mountably receiving a hinge pin 9 which extends through flanges 31 and an apertured hinge clevis 32 extending upwardly from the tailgate door. Hinge pin 9 extends through flanges 31 and clevis 32, with the pin being maintained in position by suitable flat washers and cotter pins.

Figure 3:
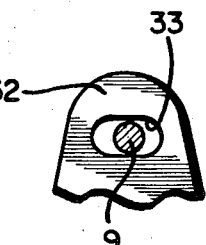
FIG. 3 is a sectional view taken along the section lines 3—3 of FIG. 1 illustrating the slot in the hinge clevis to enable the door to be moved in an arc about the door hinge as well as in parallel movement with respect with the door frame.

As illustrated in FIG. 3, the aperture in clevis 32 is in the form of a horizontal, longitudinal slot 33 which is slightly larger than hinge pin 9. As an example, the hinge clevis slot 33 may be about two inches long by slightly more than one inch wide, while hinge pin 9 may be about one inch in diameter. This aids in enabling the tailgate door to pivot arcuately about the hinge until reaching a substantially vertical position, at which time the door can then be moved in a restricted horizontal manner substantially parallel into the door frame during locking, while preventing vertical movement of the door. A much tighter seal is obtained substantially around the entire perimeter of the door and vehicle door frame than in the prior art and without requiring time consuming shim adjustments.

Figure 2:
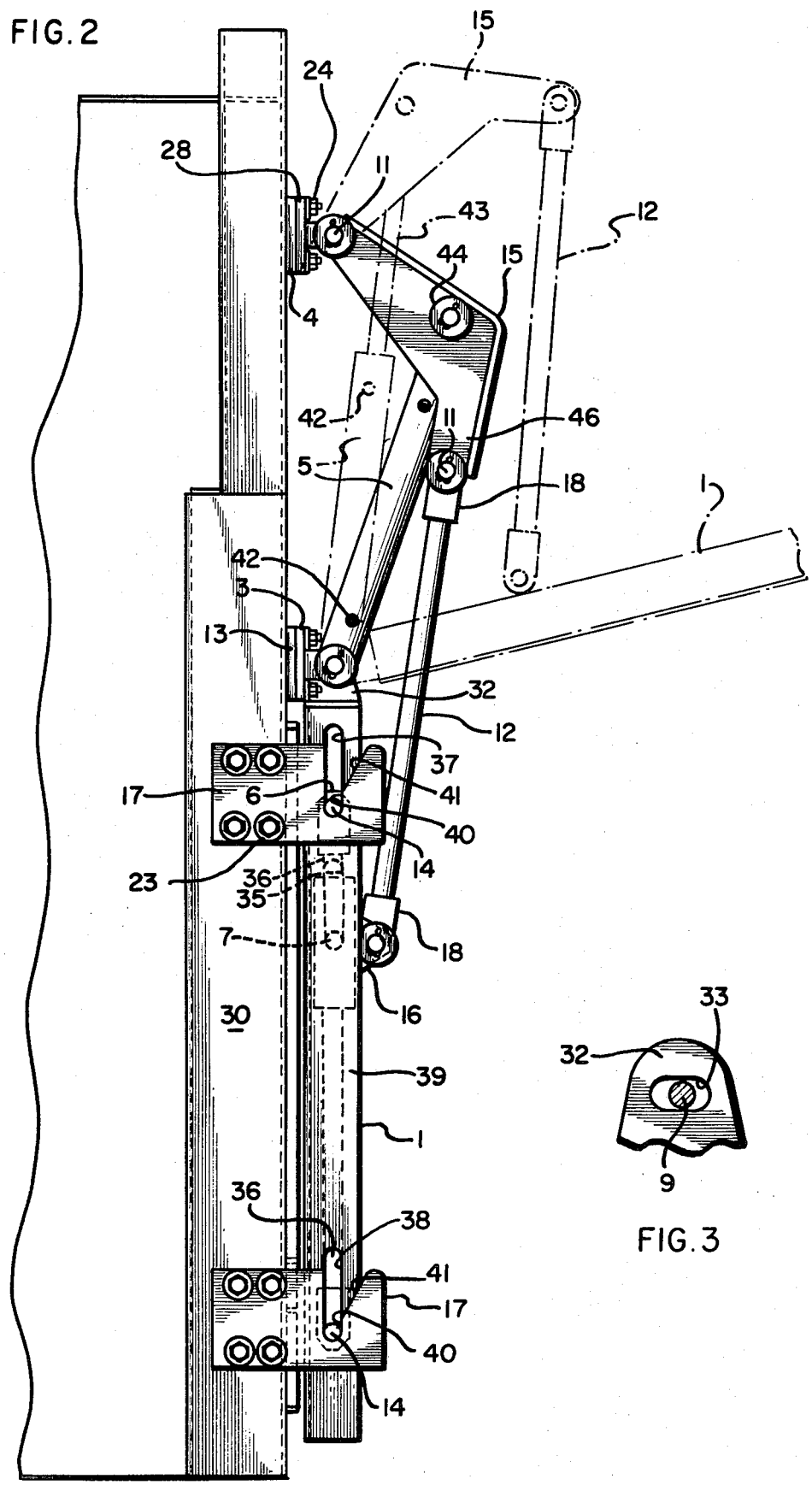
FIG. 2 is a side elevational view fragmented to illustrate the vehicle door frame, and hydraulic operating apparatus for a hydraulically operated tailgate door in accordance with the principles of the present invention.

Tailgate door 1 includes a pair of vertical channel members 34 at each end, with each channel member containing longitudinal slots 35 therein for receiving a guide pin 7 carried by a locking ram 16 which slides vertically along the door and between channels 34. Each end of the locking ram is mounted to a respective sliding rod 36 at the top and bottom of the ram, with each rod 36 terminating in a rod eye 6 each with a horizontal latch pin 14 extending through respective slots in the channels 34 and through a top slot 37 and bottom slot 38 in an end plate 39 on the tailgate door. A latch 17 is mounted to the vehicle door frame and is provided for each latch pin as shown for instance in FIG. 2. FIG. 2 also clearly illustrates each latch pin in its locked position within a locking slot 40 provided on each of the latches. Also, as can be seen from FIG. 2, movement vertically upward of locking ram 16 moves the latch pins upwardly out of locking slot 40 and upwardly along end plate slots 37, 38. Each of the latches 17 are mounted to the vehicle by means of bolts 23 and suitable flat washers and lock washers. Longitudinal, horizontal slot 33 in door clevis 32 permits the door to move in a restricted horizontal manner, substantially parallel away from the door frame with latch pins 14 extending slightly upwardly on a ramp 41 leading to the locking slot provided on each of the latches.

Hydraulic cylinder 5 has one end pivotally mounted to suitable means such as a mount bracket 3 and a pin 10 on top a mounting plate 13 affixed to the door frame. The hydraulic cylinder includes suitable inlet-outlet ports 42 coupled to a hydraulic supply system for controlling the hydraulic piston 43 illustrated in dashed lines.

Hydraulic piston 43 is mounted through a pivotal connection 44 to the middle portion of an angled bracket 15. Angled bracket 15 has an upper end portion 45 pivotally mounted through hinge pin 11, mounting plate 4, mounting bracket 28 and suitable studs, washers and nuts 24 to vehicle 30 at a position above the pivoting hydraulic cylinder. Angled bracket 15 also includes a lower end portion 46. A lift bar 12 includes at each end thereof an aperture end member 18. Top end member 18 is pivotally connected to end portion 46 of bracket 15 through a pin 11 and suitable washers and cotter pins. Bottom end member 18 is pivotally connected to locking ram 16 by a pin 8 and suitable washers and cotter pins.

The dashed lines in FIG. 2 illustrate the raised position of tailgate door 1 as opposed to the locked position of the tailgate door shown in the normal solid line view of FIG. 1.

In operation, upon suitable hydraulic actuation, hydraulic piston 43 pivots angled bracket 15 thereby vertically moving latch pins 14 upwardly out of each locking slot 40 with the door being permitted by the slotted hinge clevis 32 to float horizontally outward in substantially parallel movement away from the door frame, while vertical movement of the door is restricted. Continued extension of the hydraulic piston 43 continues to move the latch pins in end plate slots 37 and 38 until they reach the top thereof (and the top of channel member slots) at which point the latch pins will have cleared the top of ramps 41 and the door will then be pivotally raised in the indicated arc about the door hinge until reaching the fully opened position shown in the dashed lines of FIG. 2.

Lowering and locking of the tailgate door by means of the present invention is accomplished by actuating hydraulic cylinder 5 to permit retraction of hydraulic piston 43 and downward pivoting movement of angled bracket 15. This pivots the tailgate door from the opened position in an arc until sliding rod 36 begins a downward movement to move latch pins 14 from the top of slots 37, 38 (and corresponding slots in the channel members) to the bottom thereof. At this time, the door 1 will be in a substantially vertical position with the latch pins 14 engaging respective latch ramps 41 at the bottom thereof. The door is then tightly closed by continuing retraction of hydraulic piston 43 forcing latch pins 14 downwardly along the remainder of ramps 41 and into locking slots 40. During this final locking procedure, slotted door hinge clevis 32 permits the door a restricted horizontal, substantial parallel movement inwardly towards the door frame, while vertical movement of the door is prevented, to enable a positive effective seal to be obtained completely around the door perimeter. Since latches 17 are on the side of the vehicle door frame, they are not susceptible to being clogged with material being dumped through the door frame opening.

Thus, it can be seen that in accordance with one feature of the present invention, the same hydraulic operating means utilized for raising and lowering the door are also used to lock and unlock the door. In addition, and more importantly, the illustrated apparatus provides an effective seal to be obtained for tailgate type hinged doors by enabling the door to be moved substantially parallel to the door frame during locking. It is to be understood of course, that while the present invention has been illustrated in connection with a tailgate door of a vehicle, the invention is not to be so limited as the principles thereof may also be applied in many other hydraulically operated door systems.

In situations where the tailgate door 1 is mounted on a truck with a heavy duty industrial vacuum unit creating a substantial vacuum which pulls the door towards the vehicle door frame, the bottom of locking slots 40 should be slightly larger than the diameter of locking pin 14. This will permit the door to be effectively sealed with the vehicle door frame as the pin 14 moves horizontally within the locking slot and towards the vehicle.

The foregoing detailed description has been given for clearness of understanding only, and no unnecessary limitations should be understood therefrom, as modifications will be obvious to those skilled in the art.

What is claimed is:

1. In hydraulically operated door apparatus for opening and closing a hinged door on a door frame, including at least one hydraulic piston/cylinder operatively connected between the door and the frame, the improvement comprising door locking/unlocking means actuated by said hydraulic piston/cylinder for locking the door upon closing thereof and unlocking the door prior to opening thereof, and wherein during said locking and unlocking the door is restricted to horizontal, substantially parallel movement with respect to said door frame.

2. The improvement of claim 1, wherein said door locking/unlocking means includes hinge means connecting said door and door frame enabling pivotal movement of said door during raising and lowering and restricting said door to horizontal, substantially parallel movement with respect to said door frame during locking and unlocking while preventing vertical movement of said door.

3. The improvement of claim 1, wherein said door locking/unlocking means includes bracket means mounted to said door frame and pivotally actuated by said hydraulic piston/cylinder, and sliding rod means pivotally connected intermediate said bracket means and said door, including latch means for locking said door to the frame upon actuation of said hydraulic piston/cylinder.

4. The improvement of claim 2, wherein said latch means includes slidable locking pins engageable with respective slotted latches affixed to said door frame.

5. Hydraulically operated tailgate door apparatus comprising:
  a door frame;
  a door, including hinge means at the top of said door mounted to said door frame to enable said door to pivot arcuately about said hinge means and with respect to said frame;
  at least one hydraulic piston/cylinder means having one end pivotally connected to said door frame and the other end pivotally connected to said door for raising and lowering said door pivotally about said hinge means; and
  means for moving said door in a restricted horizontal, substantially parallel movement with respect to said door frame immediately prior to closing said door against said frame.

6. Hydraulically operated tailgate door apparatus according to claim 4, wherein said means for moving said door in a restricted horizontal, substantially parallel movement with respect to said door frame includes an elongated horizontal slot in said hinge means preventing vertical movement of said door.

7. Hydraulically operated tailgate door apparatus according to claim 6, wherein said means for moving said door in a restricted horizontal, substantially parallel movement with respect to said door frame includes sliding rod means pivotally connected intermediate said hydraulic piston/cylinder means and said door for urging said door in said restricted horizontal, substantially parallel movement.

8. Hydraulically operated tailgate door apparatus according to claim 7, including latch means for locking said door to the frame upon actuation of said hydraulic piston/cylinder means.

9. Hydraulically operated tailgate door apparatus according to claim 7, including slotted latches affixed to said door frame, and wherein said sliding rod means includes at least one elongated rod slidably mounted on said door and a pair of locking pins mounted to opposite ends of said elongated rod and adapted to respectively engage said slotted latches during said restricted horizontal, substantially parallel movement of said door.

10. Hydraulically operated tailgate door apparatus according to claim 9, including slot means in said door, and a guide pin mounted to said elongated rod intermediate said locking pins and adapted for slidable engagement within said slot means.

* * * * *

UNITED STATES PATENT AND TRADEMARK OFFICE
CERTIFICATE OF CORRECTION

PATENT NO. : 4,361,985
DATED : December 7, 1982
INVENTOR(S) : Thomas M. DeMarco

It is certified that error appears in the above-identified patent and that said Letters Patent are hereby corrected as shown below:

Column 4, line 30, before "a restricted horizontal, substantial parallel movement" insert the words --to move in--.

Signed and Sealed this

Twenty-second Day of February 1983

[SEAL]

Attest:

GERALD J. MOSSINGHOFF

Attesting Officer     Commissioner of Patents and Trademarks